United States Patent
Nakazawa et al.

(10) Patent No.: US 10,358,847 B2
(45) Date of Patent: Jul. 23, 2019

(54) PRESSURE SENSOR MALFUNCTION DETECTION DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yuu Nakazawa, Kariya (JP); Hisashi Hagiwara, Toyota (JP); Yusuke Mase, Toyota (JP); Yujiro Miyata, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 48 days.

(21) Appl. No.: 15/526,542

(22) PCT Filed: Nov. 12, 2015

(86) PCT No.: PCT/JP2015/005650
§ 371 (c)(1),
(2) Date: May 12, 2017

(87) PCT Pub. No.: WO2016/079961
PCT Pub. Date: May 26, 2016

(65) Prior Publication Data
US 2017/0328093 A1    Nov. 16, 2017

(30) Foreign Application Priority Data
Nov. 17, 2014    (JP) ................. 2014-232905

(51) Int. Cl.
E05B 81/66    (2014.01)
B60R 21/00    (2006.01)
(Continued)

(52) U.S. Cl.
CPC .............. *E05B 81/66* (2013.01); *B60R 21/00* (2013.01); *B60R 25/1004* (2013.01);
(Continued)

(58) Field of Classification Search
CPC ... B60R 21/00; B60R 25/1004; B60R 21/015; E05B 81/66; E05B 81/70; E05B 83/36;
(Continued)

(56) References Cited

U.S. PATENT DOCUMENTS 4,269,456 A * 5/1981 Kondo ..................... B60T 8/425
                                                  303/115.3
6,038,912 A * 3/2000 Isobe .................... G01L 27/007
                                                  73/1.59
(Continued)

OTHER PUBLICATIONS

English Translation, Richard et al., Method for a functional test of a pressure pick-up, Dec. 2007, Bayerische Motoren Werke.*

*Primary Examiner* — John Fitzgerald
*Assistant Examiner* — Truong D Phan
(74) *Attorney, Agent, or Firm* — Knobbe, Martens, Olson & Bear, LLP (57) ABSTRACT

An external impact avoiding part makes a sensor failure detection part withhold from determining that a right or left door pressure sensor has failed when a right-left detection difference calculated at first time is a threshold value or larger, and makes a detection value comparison part calculate the right-left detection difference again after a calming time has elapsed. An effect of closing operation of a right door on the right door pressure sensor or an effect of closing operation of a left door on the left door pressure sensor reduces during the calming time. The avoiding part subsequently makes the detection part compare the right-left detection difference calculated again with the threshold value. As a result of the comparison, when the right-left detection difference is the threshold value or larger, the
(Continued)

avoiding part makes the detection part determine that the right or left door pressure sensor has failed.

9 Claims, 6 Drawing Sheets

(51) Int. Cl.
*B60R 25/10* (2013.01)
*E05B 81/70* (2014.01)
*E05B 83/36* (2014.01)
*G07C 5/08* (2006.01)
*G01L 27/00* (2006.01)

(52) U.S. Cl.
CPC .............. *E05B 81/70* (2013.01); *E05B 83/36* (2013.01); *G01L 27/007* (2013.01); *G07C 5/0816* (2013.01)

(58) Field of Classification Search
CPC ......... G01L 25/00; G01L 5/00; G01L 27/007; G01L 27/00; G01L 9/06; G07C 5/0816; G07C 5/0858; F02D 41/222; A61B 5/02156; F15B 19/002; G01F 25/0007; G01F 25/0053; G01F 25/003; G01D 3/08; B60T 8/172; B60T 17/221; B60T 8/885; B60T 2270/413; G06Q 10/06; G01B 7/315; G01B 13/22; B60K 25/02; B60W 20/00; B60W 30/1886; G01N 3/12; G01M 3/26; B60N 2/002
USPC ....... 73/1.57, 1.59, 1.35, 37, 1.08; 701/29.7, 701/32.1, 33.5, 30.6
See application file for complete search history.

(56) References Cited

U.S. PATENT DOCUMENTS

| | | | | |
|---|---|---|---|---|
| 6,800,958 | B1* | 10/2004 | Baer | B60R 16/027 307/10.1 |
| 2003/0046993 | A1* | 3/2003 | Fujii | B60C 23/0408 73/146.5 |
| 2004/0112139 | A1* | 6/2004 | Ogino | B60J 10/00 73/756 |
| 2004/0134256 | A1* | 7/2004 | Herrmann | G01L 27/007 73/1.59 |
| 2005/0068177 | A1* | 3/2005 | Chun | G08B 13/1681 340/550 |
| 2006/0276965 | A1* | 12/2006 | Ide | B60R 21/0136 701/301 |
| 2006/0277907 | A1* | 12/2006 | Ueda | F02B 37/16 60/601 |
| 2007/0238923 | A1* | 10/2007 | Kubach | G01M 3/26 600/118 |
| 2008/0249687 | A1* | 10/2008 | Le | B60R 21/0132 701/45 |
| 2013/0008244 | A1* | 1/2013 | Okoshi | F02D 41/222 73/114.57 |
| 2013/0184943 | A1* | 7/2013 | Sato | B60H 1/00978 701/49 |
| 2014/0148991 | A1* | 5/2014 | Park | F02D 41/222 701/31.1 |

* cited by examiner

PRESSURE SENSOR MALFUNCTION DETECTION DEVICE

CROSS REFERENCE TO RELATED APPLICATION

This application is based on Japanese Patent Application No. 2014-232905 filed on Nov. 17, 2014, the disclosure of which is incorporated herein by reference.

TECHNICAL FIELD

The present disclosure relates to a pressure sensor malfunction detection device that detects a failure of a pressure sensor provided at a door of a vehicle.

BACKGROUND ART

Conventionally, a pressure sensor is attached in the door of a vehicle mainly to detect a collision with the side surface of the vehicle (hereinafter referred to as a side collision) thereby to detect a pressure change in the door. When a side collision occurs with the vehicle, the volume of the inside of the door changes, and its pressure change is detected by the pressure sensor attached. Consequently, the side collision with the vehicle is detected, and an occupant protection device such as an airbag device or a seat belt pretensioner is actuated to protect an occupant. The detection result by the above pressure sensor serves as a trigger for actuating the occupant protection device, and thus it should be an accurately-detected pressure change in the door. Thus, when the pressure sensor has failed, it has been necessary to detect this failure with precision, thus preventing the erroneous operation of the occupant protection device.

Regarding this issue, there is a conventional art relating to the method of detecting the failure of pressure sensors whereby to compare the detection values from a pair of pressure sensors provided in the right and left doors of a vehicle with each other and to determine that either one of the pressure sensors has failed when both the detection values are different beyond a predetermined degree (see, for example, Patent Document 1). In view of extremely rare failures of both the pressure sensors at the same time, the failure of either one of the pressure sensors can be detected by this conventional art. When the vehicle is located at high altitudes, both the pressure sensors detect abnormal values due to the change of the surrounding atmospheric pressure. Thus, the above conventional art can detect whether either one of the pressure sensors has failed or not separately from the abnormality of the pressure sensor due to the elevation where the vehicle is located.

PRIOR ART DOCUMENT

Patent Document

Patent Document 1: JP2005-520149T

When the door of a vehicle is closed with great force, a pressure sensor provided in the door may detect a pressure change due to an impact made on the door. The abnormal value from the pressure sensor caused by the closing operation of the door has been often erroneously determined as the failure of the pressure sensor. If the pressure sensor is erroneously determined to have failed, the operation of the occupant protection device is prohibited, and the occupant cannot be protected from the collision of the vehicle.

SUMMARY OF INVENTION

The present disclosure addresses the above issues. Thus, it is an objective of the present disclosure to provide a pressure sensor malfunction detection device that can accurately determine whether a pressure sensor provided in a door of a vehicle has failed or not.

To achieve the objective, a pressure sensor malfunction detection device in an aspect of the present disclosure includes: a right door pressure sensor that is provided in a right door of a vehicle to detect a pressure change in the right door; a left door pressure sensor that is provided in a left door of the vehicle to detect a pressure change in the left door; a detection value comparison part that calculates a difference between a detection value by the right door pressure sensor and a detection value by the left door pressure sensor to calculate a right-left detection difference; a sensor failure detection part that determines that the right door pressure sensor or the left door pressure sensor has failed when the right-left detection difference calculated by the detection value comparison part is equal to or larger than a predetermined threshold value; and an external impact avoiding part that makes the sensor failure detection part withhold from determining that the right door pressure sensor or the left door pressure sensor has failed when the right-left detection difference calculated at first time by the detection value comparison part is equal to or larger than the threshold value. The external impact avoiding part makes the detection value comparison part calculate the right-left detection difference again after a predetermined calming time has elapsed. An effect of a closing operation of the right door on the right door pressure sensor or an effect of a closing operation of the left door on the left door pressure sensor reduces during the calming time. The external impact avoiding part subsequently makes the sensor failure detection part compare the right-left detection difference calculated again with the threshold value. As a result of the comparison, when the right-left detection difference is equal to or larger than the threshold value, the external impact avoiding part makes the sensor failure detection part determine that the right door pressure sensor or the left door pressure sensor has failed.

As a consequence of this configuration, the pressure sensor malfunction detection device includes an external impact avoiding part that makes the sensor failure detection part withhold from determining that the right door pressure sensor or the left door pressure sensor has failed when the right-left detection difference calculated at first time by the detection value comparison part is equal to or larger than the threshold value. After a predetermined calming time, during which an effect of a closing operation of the right door on the right door pressure sensor or an effect of a closing operation of the left door on the left door pressure sensor reduces, has elapsed, the external impact avoiding part makes the sensor failure detection part compare the right-left detection difference calculated again with the threshold value. As a result of the comparison, when the right-left detection difference is equal to or larger than the threshold value, the external impact avoiding part makes the sensor failure detection part determine that the right door pressure sensor or the left door pressure sensor has failed. Thus, it can be accurately determined whether the right door pressure sensor or the left door pressure sensor has failed or not based on the right-left detection difference calculated after the effect of the closing operation of the right door or the left door on the right door pressure sensor or the left door pressure sensor has reduced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION (First Embodiment)

Figure 1:
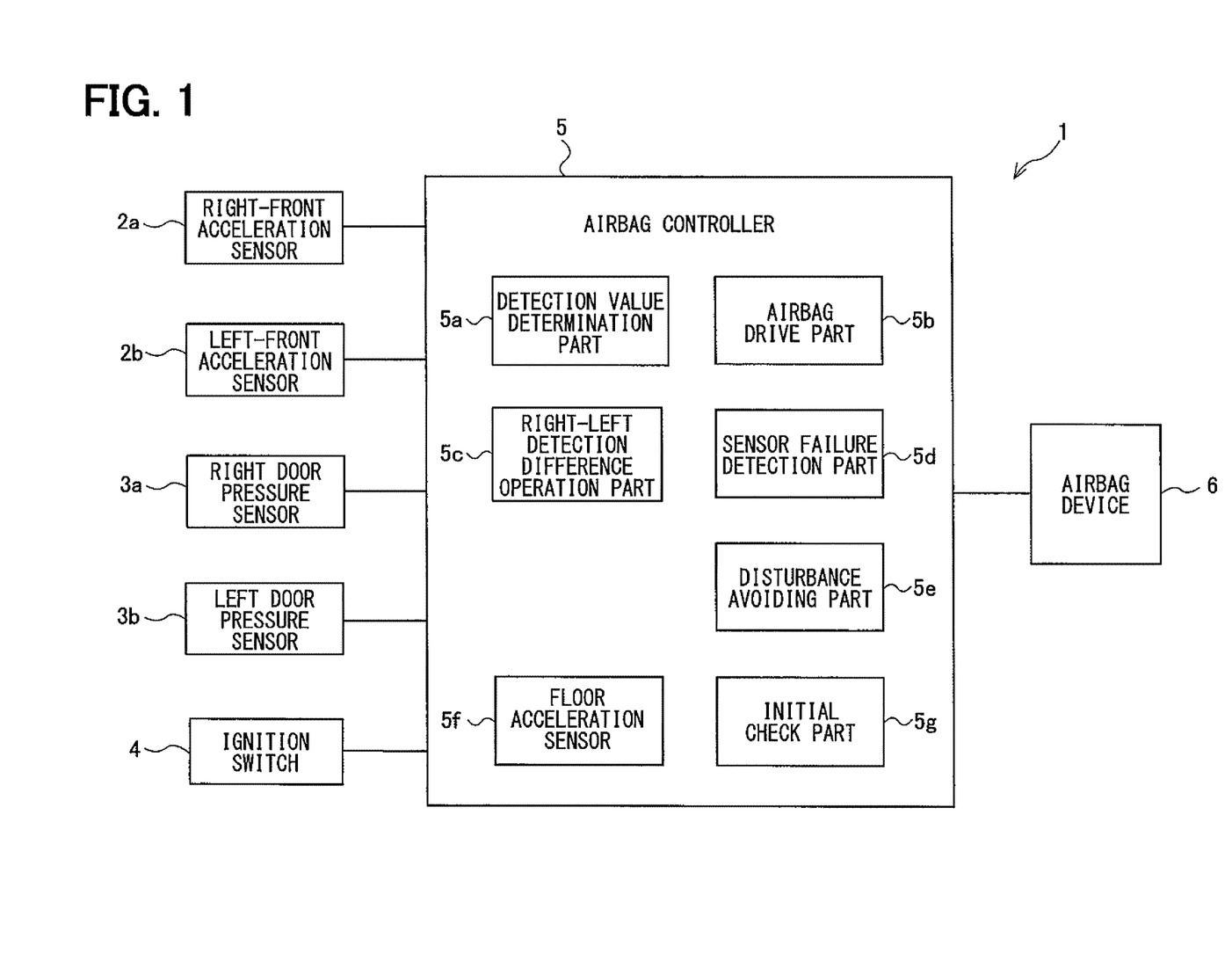
FIG. 1 is a block diagram illustrating a configuration of an occupant protection device for a vehicle in accordance with a first embodiment.

An occupant protection device 1 for a vehicle (corresponding to a pressure sensor malfunction detection device) in accordance with a first embodiment will be described with reference to FIGS. 1 to 4. As illustrated in FIG. 1, the occupant protection device 1 for a vehicle according to the present embodiment includes a right-front acceleration sensor 2a and a left-front acceleration sensor 2b, which are a pair of acceleration sensors. The right-front acceleration sensor 2a and the left-front acceleration sensor 2b are provided respectively at the right and left parts of the front surface of a vehicle 8 to detect the magnitude of the impact applied in a front-rear direction of the vehicle 8 (see FIG. 2). The right-front acceleration sensor 2a and the left-front acceleration sensor 2b are hereinafter collectively referred to as acceleration sensors 2a, 2b. The acceleration sensors 2a, 2b may be capacitance acceleration sensors, piezoresistance acceleration sensors, or acceleration sensors of a heat detection method.

Figure 2:
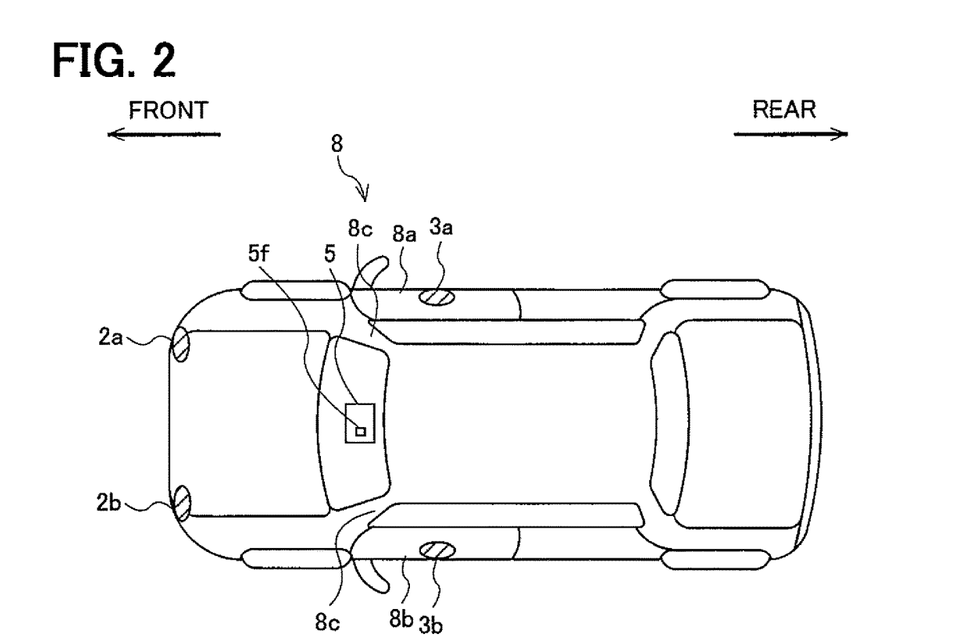
FIG. 2 is a plan view illustrating the vehicle to which the occupant protection device illustrated in FIG. 1 is attached.

A right door pressure sensor 3a is attached to the inside of a driver's seat-side door 8a (corresponding to "in a right door") of the vehicle 8, which is a right-hand drive vehicle. A left door pressure sensor 3b is attached to the inside of a front passenger seat-side door 8b (corresponding to "in a left door") of the vehicle 8. The right door pressure sensor 3a and the left door pressure sensor 3b respectively detect the pressure changes in the driver's seat-side door 8a and the front passenger seat-side door 8b, which are hinge doors to detect the impact applied in a right-left direction of the vehicle 8. The right door pressure sensor 3a and the left door pressure sensor 3b may be semiconductor strain gauge type pressure sensors, capacitance type pressure sensors, or other pressure sensors. The right door pressure sensor 3a and the left door pressure sensor 3b are hereinafter collectively referred to as pressure sensors 3a, 3b. The occupant protection device 1 for a vehicle includes an ignition switch 4. The ignition switch 4 is provided for the vehicle 8, and is a device for actuating an ignition device of an engine (not shown).

The acceleration sensors 2a, 2b, the pressure sensors 3a, 3b, and the ignition switch 4 are connected to an airbag controller 5. The airbag controller 5 will be described later. An airbag device 6 (corresponding to an occupant protection part) is connected to the airbag controller 5. The airbag device 6 is similar to a device of a prior and existing type, and is formed by an inflator, a bag, and an ignition device, which are not shown. The airbag device 6 includes a driver's seat airbag, a front passenger seat airbag, a pillar airbag accommodated in a front pillar (A-pillar) 8c, and curtain airbags accommodated in a right lateral part and a left lateral part of the vehicle 8 (all these airbags are not shown). The airbag device 6 is deployed at the time of a collision of the vehicle 8 to protect an occupant's body against the impact applied to the vehicle 8.

The airbag controller 5 is a control device formed by an input/output device, a CPU, a RAM, and so forth, and is attached to the lower part of a dashboard on a front side of the driver's seat (see FIG. 2). The airbag controller 5 includes a detection value determination part 5a, an airbag drive part 5b, a right-left detection difference operation part 5c, a sensor failure detection part 5d, a disturbance avoiding part 5e, a floor acceleration sensor 5f, and an initial check part 5g. Based on the accelerations detected by the acceleration sensors 2a, 2b or the pressure changes detected by the pressure sensors 3a, 3b, the detection value determination part 5a (corresponding to a collision detection part) determines whether such a collision as to actuate the airbag device 6 of the vehicle 8 has occurred. If the detection value determination part 5a determines that such a collision as to actuate the airbag device 6 of the vehicle 8 has occurred, the airbag drive part 5b (corresponding to a protection drive part) applies a squib current for actuating the airbag device 6 to the airbag device 6. The right-left detection difference operation part 5c (corresponding to a detection value comparison part) calculates the difference between the detection value by the right door pressure sensor 3a and the detection value by the left door pressure sensor 3b to calculate a right-left detection difference |PSR−PSL| (≥0). If the right-left detection difference |PSR−PSL| calculated by the right-left detection difference operation part 5c is equal to or larger than a predetermined threshold value Dif, the sensor failure detection part 5d (corresponding to a sensor failure detection part) determines that the pressure sensor 3a, 3b has failed.

If the right-left detection difference |PSR−PSL| calculated at the first time by the right-left detection difference operation part 5c is equal to or larger than the threshold value Dif, the disturbance avoiding part 5e (corresponding to an external impact avoiding part) makes the sensor failure detection part 5d withhold from determining that the pressure sensor 3a, 3b has failed. Then, after a predetermined individual calming time Tdm (corresponding to a calming time), during which the effect of the closing operation of the driver's seat-side door 8a on the right door pressure sensor 3a or the effect of the closing operation of the front passenger seat-side door 8b on the left door pressure sensor 3b reduces, has elapsed, the right-left detection difference operation part 5c is made to calculate the right-left detection difference |PSR−PSL| again. Subsequently, as a result of the comparison between the right-left detection difference |PSR−PSL| calculated again and the threshold value Dif by the sensor failure detection part 5d, it is determined that the pressure sensor 3a, 3b has failed if the right-left detection difference |PSR−PSL| is equal to or larger than the threshold value Dif. The floor acceleration sensor 5f is formed to be capable of detecting the acceleration of the vehicle 8 in the front-rear direction and in the right-left direction. The floor acceleration sensor 5f may include independently a sensor that can detect the acceleration of the vehicle 8 in the right-left direction, and a sensor that can detect the acceleration of the vehicle 8 in the front-rear direction. The initial check part 5g (corresponding to an operation check part) checks (initial check) whether the airbag device 6 can be driven normally by the airbag controller 5 after the ignition switch 4 is turned on.

Figure 3:
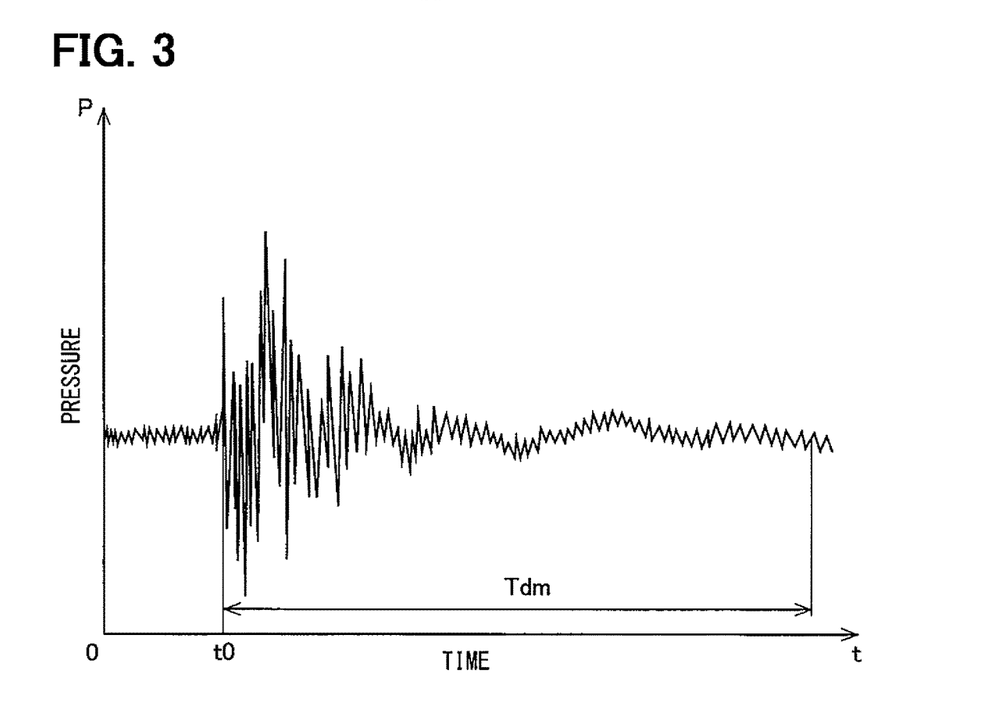
FIG. 3 is a diagram schematically illustrating a temporal change of a pressure detection value by a pressure sensor attached in a door of the vehicle of the first embodiment.

As illustrated in FIG. 3, when the driver's seat-side door 8a or the front passenger seat-side door 8b of the vehicle 8, which is a hinge door, is closed, the pressure sensor 3a, 3b that is integrated in one of the driver's seat-side door 8a and the front passenger seat-side door 8b for which this closing operation is carried out detects a sharp pressure rise (time point indicated by t0 in FIG. 3) due to the impact. After that, a pressure fluctuation continues to be detected by the pressure sensor 3a, 3b. Thus, the above-described determination that the pressure sensor 3a, 3b has failed based on the right-left detection difference |PSR−PSL| cannot be accurately made while this pressure fluctuation is continuing. However, when the above individual calming time Tdm elapses after the driver's seat-side door 8a or the front passenger seat-side door 8b is closed, the pressure fluctuation reduces, so that the determination that the pressure sensor 3a, 3b has failed can be made. A specific value for the above individual calming time Tdm can be obtained through a repeated experiment using an actual vehicle.

Figure 4:
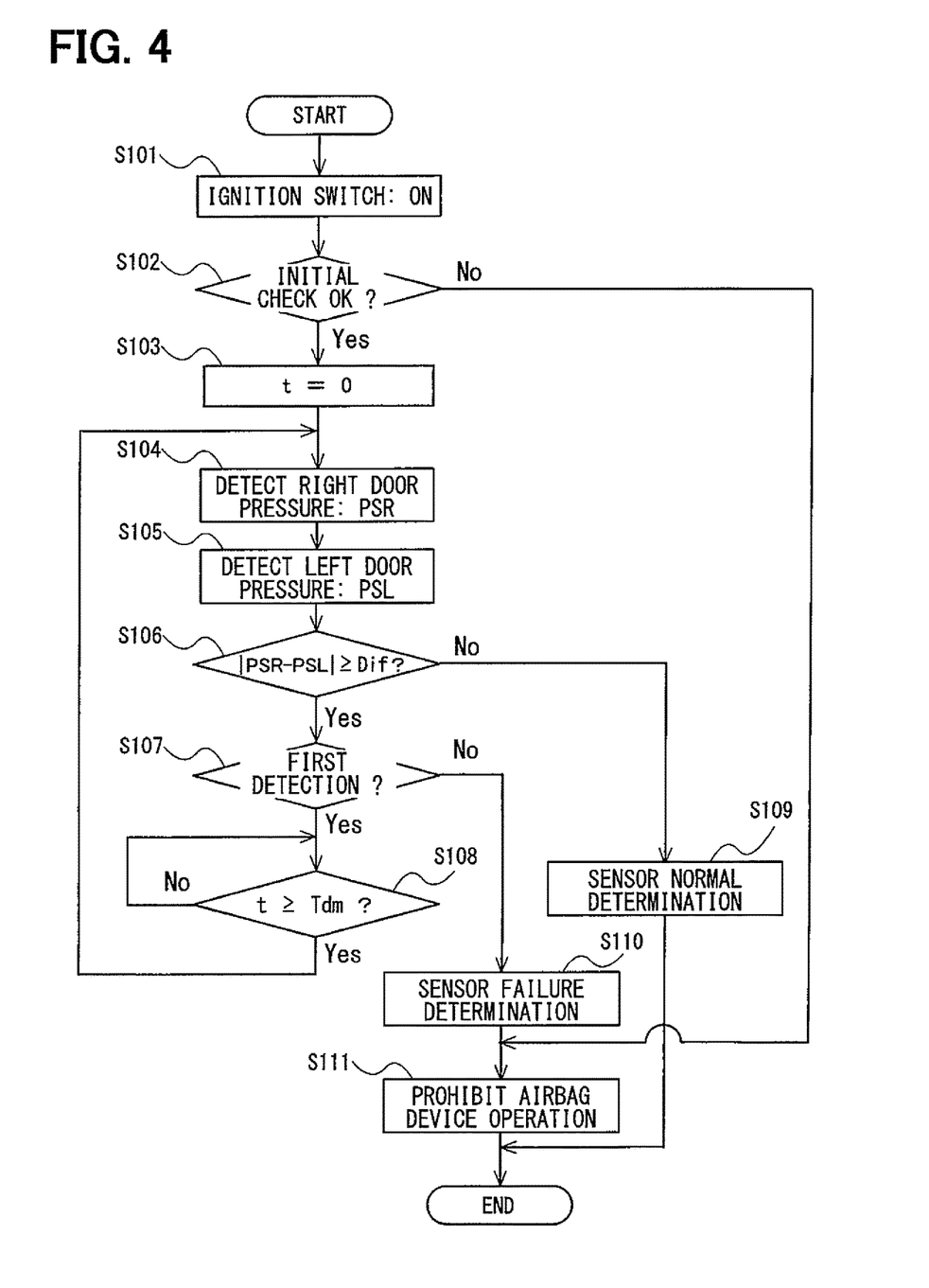
FIG. 4 is a diagram illustrating a control flow chart for a method of detecting a failure by the occupant protection device for the vehicle shown in FIG. 1.

The flow of the method of detecting the failure of the pressure sensors 3a, 3b by the airbag controller 5 of the present embodiment will be described with reference to FIG. 4. Firstly, when the ignition switch 4 of the vehicle 8 is turned on (S101), the initial check part 5g determines whether the airbag device 6 can be driven normally (S102). If it is determined by the initial check that there is anything abnormal with the occupant protection device 1 for a vehicle and that the airbag device 6 is not driven normally, control proceeds to S111. At S111, the operation of the airbag device 6 by the airbag drive part 5b is prohibited to end this flow. On the other hand, if it is determined at S102 that the occupant protection device 1 for a vehicle is not abnormal and that the airbag device 6 can be driven normally, a timer in the airbag controller 5 is started after a count time is reset (S103). After that, a pressure PSR in the driver's seat-side door 8a is detected by the right door pressure sensor 3a (S104), and then a pressure PSL in the front passenger seat-side door 8b is detected by the left door pressure sensor 3b (S105). In this flow, the pressure PSL is detected by the left door pressure sensor 3b after the detection of the pressure PSR by the right door pressure sensor 3a, but actually, both the pressures PSL are assumed to be detected at the same time point without trouble, since a time difference between both the detections is very small.

Then, the right-left detection difference operation part 5c calculates the first-time right-left detection difference |PSR−PSL| using the detected pressures PSR, PSL. The sensor failure detection part 5d determines whether the right-left detection difference |PSR−PSL| calculated by the right-left detection difference operation part 5c is equal to or larger than the threshold value Dif (S106). If the right-left detection difference |PSR−PSL| is smaller than the threshold value Dif (corresponding to "smaller than a threshold value"), it is determined that the pressure sensors 3a, 3b are normal to end this flow (S109). On the other hand, if it is determined at S106 that the right-left detection difference |PSR−PSL| is equal to or larger than the threshold value Dif, the disturbance avoiding part 5e determines whether the detection of the pressure PSR in the driver's seat-side door 8a and the pressure PSL in the front passenger seat-side door 8b at this time is the first detection (S107). If the detection of the pressures PSR, PSL at this time is the first detection, the disturbance avoiding part 5e does not make the sensor failure detection part 5d determine that the pressure sensor 3a, 3b has failed (withholds from the determination that the pressure sensor 3a, 3b has failed).

Subsequently, the disturbance avoiding part 5e confirm with the timer that the individual calming time Tdm has elapsed, and then returns to S104 again to perform the detection of the pressures PSR, PSL at the second time (S108). After that, the right-left detection difference operation part 5c again calculates the right-left detection difference |PSR−PSL| using the detected pressures PSR, PSL. The sensor failure detection part 5d determines whether the right-left detection difference |PSR−PSL| calculated by the right-left detection difference operation part 5c is equal to or larger than the threshold value Dif (S106). If it is determined by the sensor failure detection part 5d that the right-left detection difference |PSR−PSL| is equal to or larger than the threshold value Dif, it is again determined at S107 whether the detection of the pressure PSR in the driver's seat-side door 8a and the pressure PSL in the front passenger seat-side door 8b at this time is the first detection. If it is determined that the detection of the pressures PSR, PSL at this time is not the first detection, the sensor failure detection part 5d determines that the pressure sensor 3a, 3b has failed (S110). Then, the operation of the airbag device 6 by the airbag drive part 5b is prohibited at S111 to end this flow.

In the present embodiment, if the right-left detection difference |PSR−PSL| calculated at the first time by the right-left detection difference operation part 5c is equal to or larger than the threshold value Dif, the disturbance avoiding part 5e of the occupant protection device 1 for a vehicle withholds from the determination by the sensor failure detection part 5d that the pressure sensor 3a, 3b has failed. Subsequently, after the predetermined individual calming time Tdm, during which the effect of the closing operation of the driver's seat-side door 8a on the right door pressure sensor 3a or the effect of the closing operation of the front passenger seat-side door 8b on the left door pressure sensor 3b reduces, has elapsed, the disturbance avoiding part 5e makes the comparison between the right-left detection difference |PSR−PSL| calculated again and the threshold value Dif. As a consequence, if the right-left detection difference |PSR−PSL| is equal to or larger than the threshold value Dif, it is determined that the pressure sensor 3a, 3b has failed. Thus, it can be accurately determined whether the pressure sensor 3a, 3b has failed or not based on the right-left detection difference |PSR−PSL| calculated after the effect of the closing operation of the driver's seat-side door 8a or the front passenger seat-side door 8b on the pressure sensor 3a, 3b has reduced. When the ignition switch 4 of the vehicle 8 is turned on, the right-left detection difference operation part 5c calculates the right-left detection difference |PSR−PSL| at the first time. Consequently, the failure of the pressure sensors 3a, 3b is not constantly detected, so that the loads on the airbag controller 5 and the entire occupant protection device 1 for a vehicle due to the failure detection can be reduced.

The occupant protection device 1 for a vehicle includes the detection value determination part 5a that detects the collision of the vehicle 8 based on the detection values by the acceleration sensors 2a, 2b and the pressure sensors 3a, 3b, the airbag device 6 that protects the occupant's body against the impact applied to the vehicle 8, the airbag drive part 5b that actuates the airbag device 6 when the detection value determination part 5a detects the collision of the vehicle 8, and the initial check part 5g that determines whether the airbag device 6 is driven normally. After the initial check part 5g determines that the airbag device 6 is driven normally, the detection value determination part 5a calculates the right-left detection difference |PSR−PSL| at the first time. Consequently, the abnormal condition of the occupant protection device 1 for a vehicle can be eliminated before the failure of the pressure sensors 3a, 3b is detected. Thus, the abnormal condition due to the failure of the pressure sensors 3a, 3b can be detected accurately. When it is determined by the sensor failure detection part 5d that the pressure sensor 3a, 3b has failed, the airbag drive part 5b prohibits the operation of the airbag device 6. Consequently, the erroneous operation of the airbag device 6 due to the failure of the pressure sensors 3a, 3b can be prevented to provide the safe and highly reliable occupant protection device 1 for a vehicle.

(Second Embodiment)

Figure 5:
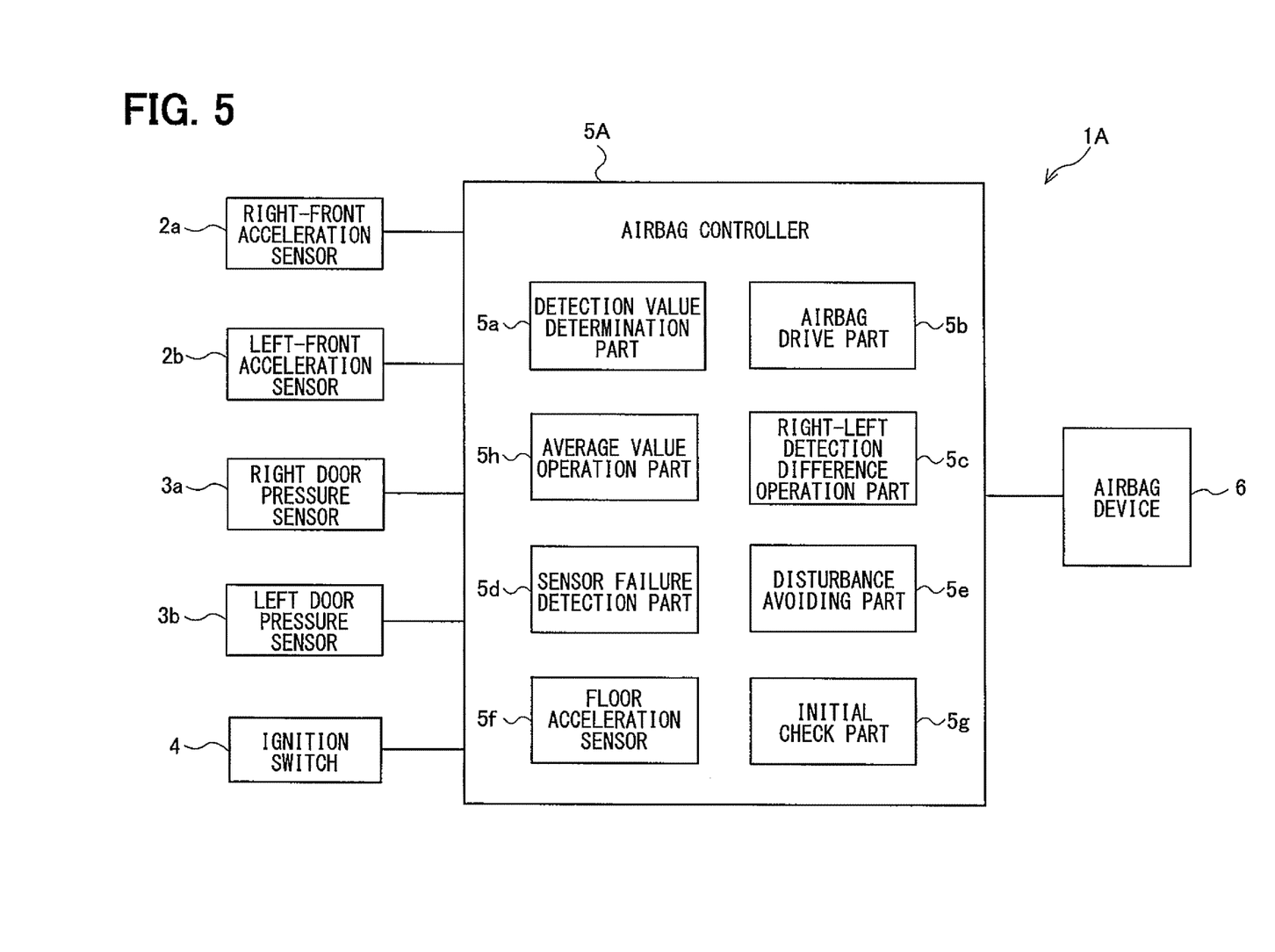
FIG. 5 is a block diagram illustrating a configuration of an occupant protection device for a vehicle in accordance with a second embodiment.
Figure 6:
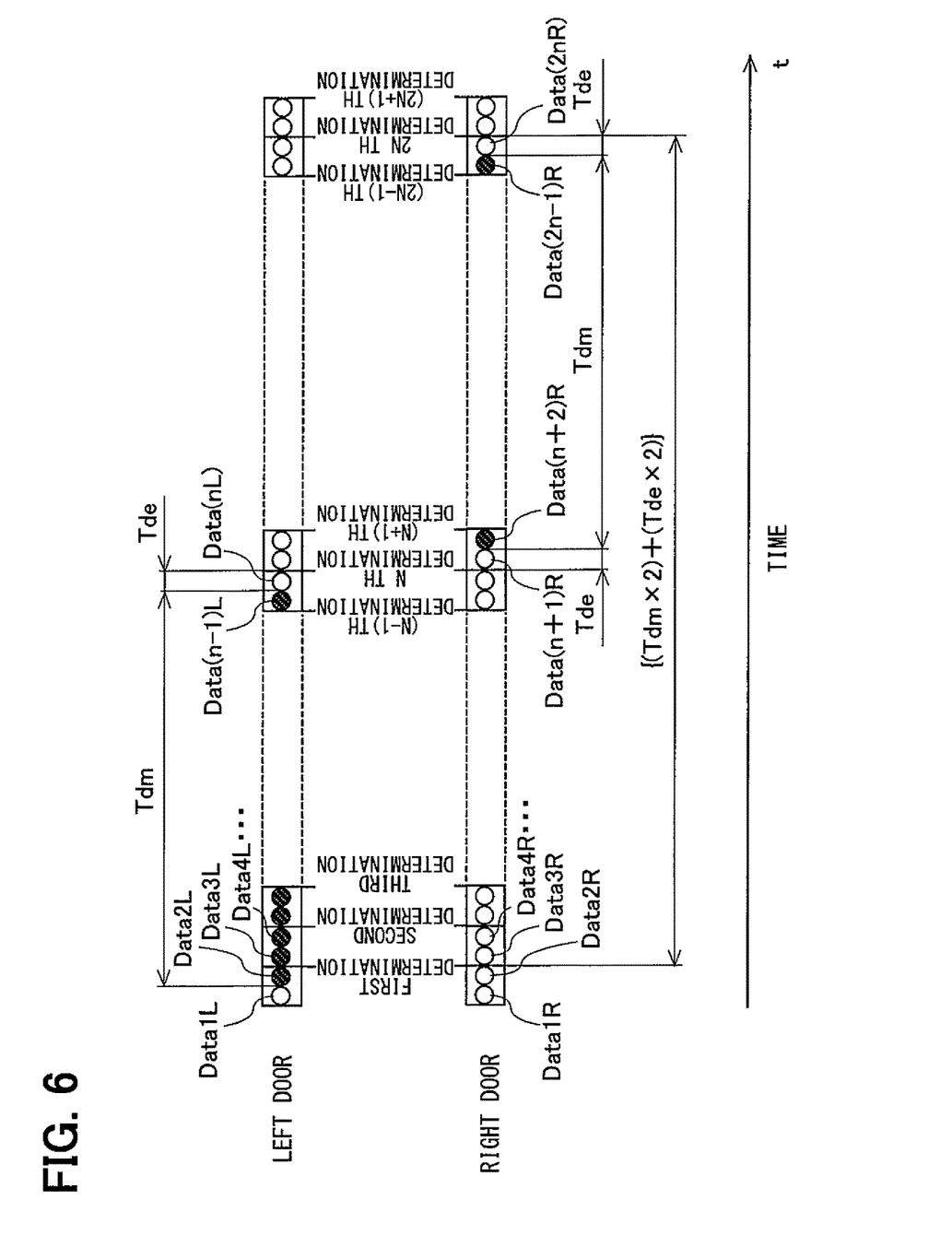
FIG. 6 is a diagram illustrating a timing diagram for explaining a method of detecting a failure by the occupant protection device for the vehicle shown in FIG. 5.
Figure 7:
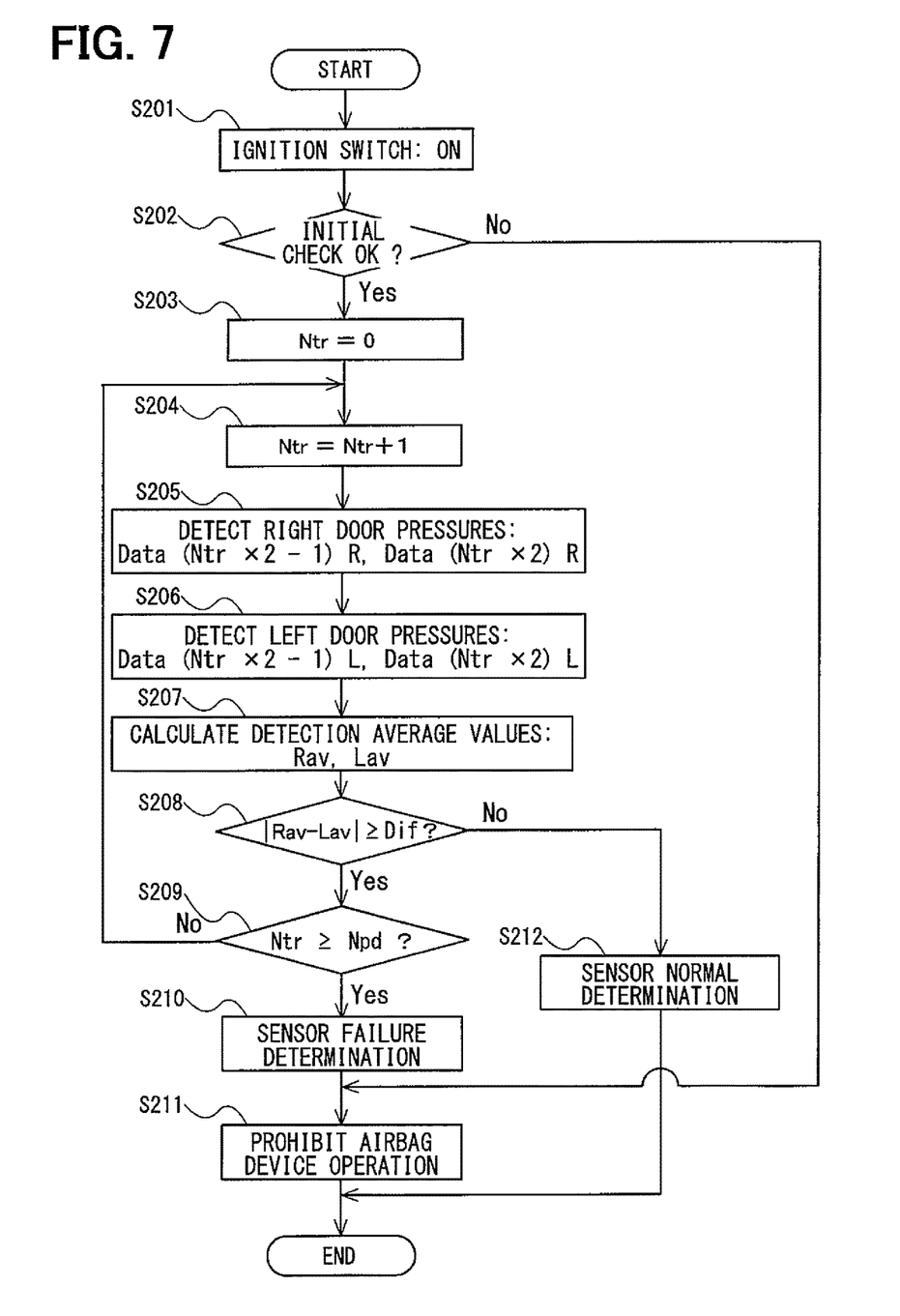
FIG. 7 is a diagram illustrating a control flow chart for the method of detecting the failure by the occupant protection device for the vehicle shown in FIG. 5.

Only the differences of an occupant protection device 1A for a vehicle in accordance with a second embodiment (corresponding to a pressure sensor malfunction detection device) from the first embodiment will be described below with reference to FIGS. 5 to 7. As illustrated in FIG. 5, an airbag controller 5A of the present embodiment includes an average value operation part 5h (corresponding to an average value calculation part) in addition to the configuration of the airbag controller 5 of the first embodiment. The average value operation part 5h averages the detection values by a right door pressure sensor 3a at two points (corresponding to a plurality of points) at which their detection time points are mutually different to calculate a right detection average value Rav. The average value operation part 5h averages the detection values by a left door pressure sensor 3b at the two points to calculate a left detection average value Lav. A right-left detection difference operation part 5c of the present embodiment calculates the difference between the right detection average value Rav and the left detection average value Lav calculated by the average value operation part 5h to calculate a right-left detection difference |Rav−Lav| (≥0).

The specific explanation will be given below. As illustrated in FIG. 6, the right door pressure sensor 3a of the present embodiment detects a pressure Data (nR) in a driver's seat-side door 8a each time a time Tde ((Tde×2) corresponds to a predetermined period) elapses. The left door pressure sensor 3b detects a pressure Data (nL) in a front passenger seat-side door 8b each time the time Tde elapses (corresponding to "the predetermined period elapses"). "n" in the pressure Data (nR), Data (nL) represents a detection time number. The pressures at mutually the same time point are detected for the pressures Data (nR), Data (nL). At the first time, the above average value operation part 5h averages the detection values Data1R, Data2R by the right door pressure sensor 3a for the pressure Data (nR) in the driver's seat-side door 8a to calculate the right detection average value Rav at that time. The average value operation part 5h averages the detection values Data1L, Data2L by the left door pressure sensor 3b for the pressure Data (nL) in the front passenger seat-side door 8b to calculate the left detection average value Lav at that time.

Based on the right detection average value Rav calculated by averaging the detection values Data1R, Data2R, and the left detection average value Lav calculated by averaging the detection values Data1L, Data2L, the right-left detection difference operation part 5c calculates the right-left detection difference |Rav−Lav|. Based on the right-left detection difference |Rav−Lav| which is the difference between the right detection average value Rav calculated by averaging the detection values Data1R, Data2R, and the left detection average value Lav calculated by averaging the detection values Data1L, Data2L, a sensor failure detection part 5d makes the first (first time) determination of the failure of the pressure sensors 3a, 3b.

If the right-left detection difference |Rav−Lav| calculated at the first time is equal to or larger than a threshold value Dif, a disturbance avoiding part 5e makes the sensor failure detection part 5d withhold from determining that the pressure sensor 3a, 3b has failed. After that, the average value operation part 5h is made to average the detection values Data3R, Data4R and to calculate the right detection average value Rav at that time, and the average value operation part 5h is made to average the detection values Data3L, Data4L and to calculate the left detection average value Lav at that time. Next, the right-left detection difference operation part 5c is made to calculate the right-left detection difference |Rav−Lav| obtained by the difference between the right detection average value Rav calculated by averaging the detection values Data3R, Data4R, and the left detection average value Lav calculated by averaging the detection values Data3L, Data4L, and the sensor failure detection part 5d is made to perform the second determination of the failure of the pressure sensors 3a, 3b. Similarly in the process thereafter, the disturbance avoiding part 5e makes the right-left detection difference operation part 5c calculate the right-left detection difference |Rav−Lav| repeatedly each time a time (Tde×2) that is shorter than the calming time elapses until a mutual calming time {(Tdm×2)+(Tde×2)} (corresponding to the calming time) elapses, unless the pressure sensors 3a, 3b are determined to be normal halfway through the process. At the time of each calculation of the right-left detection difference |Rav−Lav|, the disturbance avoiding part 5e makes the sensor failure detection part 5d compare the right-left detection difference |Rav−Lav| with the threshold value Dif. If the right-left detection difference |Rav−Lav| calculated before the mutual calming time {(Tdm×2)+(Tde×2)} elapses is equal to or larger than the threshold value Dif, the disturbance avoiding part 5e withholds from the determination by the sensor failure detection part 5d that the pressure sensor 3a, 3b has failed. At the time when the right-left detection difference |Rav−Lav| calculated before the mutual calming time {(Tdm×2)+(Tde×2)} elapses is smaller than the threshold value Dif the disturbance avoiding part 5e makes the sensor failure detection part 5d determine that the pressure sensors 3a, 3b are normal.

In the present embodiment, the disturbance avoiding part 5e simulates the strictest condition to set the mutual calming time {(Tdm×2)+(Tde×2)} that needs to elapse to avoid the effect of the closing operation of the driver's seat-side door 8a on the right door pressure sensor 3a or the effect of the closing operation of the front passenger seat-side door 8b on the left door pressure sensor 3b. Specifically, the present embodiment considers the case where the front passenger seat-side door 8b is closed and the driver's seat-side door 8a is closed immediately after its effect on the left door pressure sensor 3b is reduced (the order of the closing operations of the driver's seat-side door 8a and the front passenger seat-side door 8b may be switched). The condition simulated to calculate the mutual calming time {(Tdm×2)+(Tde×2)} in the present embodiment will be described in detail below with reference to FIG. 6. Similar to the case of the first embodiment, the present embodiment also requires the above individual calming time Tdm respectively to reduce the effect of the closing operation of the driver's seat-side door 8a on the right door pressure sensor 3a or the effect of the closing operation of the front passenger seat-side door 8b on the left door pressure sensor 3b. The configuration is set to be capable of detecting the pressures in the driver's seat-side door 8a and in the front passenger seat-side door 8b (n−2) times by the pressure sensors 3a, 3b while the individual calming time Tdm elapses (Tdm/(n−2)=Tde).

First, the front passenger seat-side door 8b is assumed to be closed after the detection value Data1L is detected before the detection value Data2L is detected by the left door pressure sensor 3b. In this case, the closing operation of the front passenger seat-side door 8b has an effect on the left door pressure sensor 3b from the detection value Data2L to the detection value Data(n−1)L. Thus, the first to Nth determinations of the failure of the pressure sensors 3a, 3b cannot be performed accurately by the sensor failure detection part 5d. Subsequently, the driver's seat-side door 8a is assumed to be closed after the detection value Data(n+1)R is detected before the detection value Data(n+2)R is detected by the right door pressure sensor 3a. In this case, the closing operation of the driver's seat-side door 8a has an effect on the right door pressure sensor 3a from the detection value Data(n+2)R to the detection value Data(2n−1)R. Thus, the (N+1)th to 2 Nth determinations of the failure of the pressure sensors 3a, 3b cannot be performed accurately by the sensor failure detection part 5d. For those hatched of the symbols representing the detection values Data(nR), Data(nL) by the pressure sensors 3a, 3b in FIG. 6, the closing operation of the driver's seat-side door 8a or the front passenger seat-side door 8b has an effect on their detection values. For these reasons, it is found that the (2N+1)th determination of the failure of the pressure sensors 3a, 3b can also be performed accurately by the sensor failure detection part 5d in the case where the front passenger seat-side door 8b is closed and the driver's seat-side door 8a is closed immediately after its effect on the left door pressure sensor 3b is reduced. Therefore, the mutual calming time of the present embodiment, during which the effect of the closing operation of the driver's seat-side door 8a or the closing operation of the front passenger seat-side door 8b on the pressure sensor 3a, 3b reduces, is expressed by {(Tdm×2)+(Tde×2)} (see FIG. 6).

The flow of the method of detecting the failure of the pressure sensors 3a, 3b by the airbag controller 5A of the present embodiment will be described with reference to FIG. 7. "Ntr" in the flow chart illustrated in FIG. 7 represents the number of times of the determination of the failure of the pressure sensors 3a, 3b indicated in FIG. 6. Firstly, when an ignition switch 4 of a vehicle 8 is turned on (S201), an initial check part 5g determines whether an airbag device 6 can be driven normally by the airbag controller 5 (S202). If it is determined by the initial check that there is anything abnormal with the occupant protection device 1A for a vehicle and that the airbag device 6 is not driven normally, control proceeds to S211. At S211, the operation of the airbag device 6 by an airbag drive part 5b is prohibited to end this flow.

On the other hand, if it is determined at S202 that the occupant protection device 1A for a vehicle is not abnormal and that the airbag device 6 can be driven normally, Ntr is incremented by one (S204) after setting: Ntr=0 (S203).

Then, the right door pressure sensor 3a detects the pressures Data1R, Data2R in the driver's seat-side door 8a (S205). Next, the left door pressure sensor 3b detects the pressures Data1L, Data2L in the front passenger seat-side door 8b (S206). The average value operation part 5h averages the detection values Data1R, Data2R to calculate the right detection average value Rav, and averages the detection values Data1L, Data2L to calculate the left detection average value Lav (S207). After that, using the detected right detection average value Rav and the detected left detection average value Lav, the right-left detection difference operation part 5c calculates the right-left detection difference |Rav−Lav|, and the sensor failure detection part 5d determines whether the right-left detection difference |Rav−Lav| calculated by the right-left detection difference operation part 5c is equal to or larger than the threshold value Dif (S208). If the right-left detection difference |Rav−Lav| is smaller than the threshold value Dif, it is determined that the pressure sensors 3a, 3b are normal to end this flow (S212).

On the other hand, if it is determined at S208 that the right-left detection difference |Rav−Lav| is equal to or larger than the threshold value Dif, the disturbance avoiding part 5e determines whether the number Ntr of times of the determination of the failure of the pressure sensors 3a, 3b at this time is equal to or larger than Npd (S209). As will be appreciated from the foregoing, Npd is set at (2N+1). If the number Ntr of times of the failure determination at this time does not reach (2N+1)th determination, the disturbance avoiding part 5e makes the sensor failure detection part 5d withhold from determining that the pressure sensor 3a, 3b has failed. The disturbance avoiding part 5e returns to S204 again to increment Ntr by one, and then carries out the detection of the pressures Data(nR), Data(nL) again. Using the right detection average value Rav and the left detection average value Lav, which are obtained respectively by averaging the detected pressures Data(nR), Data(nL), the right-left detection difference operation part 5c calculates again the right-left detection difference |Rav−Lav|, and the sensor failure detection part 5d determines whether the right-left detection difference |Rav−Lav| calculated by the right-left detection difference operation part 5c is equal to or larger than the threshold value Dif (S208). If it is determined at S209 that the number Ntr of times of the determination of the failure of the pressure sensors 3a, 3b at this time is equal to or larger than Npd (=2N+1), it is determined that the pressure sensor 3a, 3b has failed (S210), and then the operation of the airbag device 6 by the airbag drive part 5b is prohibited at S211 to end this flow.

In the present embodiment, the occupant protection device 1A for a vehicle includes the average value operation part 5h that averages the detection values Data(nR) by the right door pressure sensor 3a at two points, at which their detection time points are mutually different, to calculate the right detection average value Rav, and that averages the detection values Data(nL) by the left door pressure sensor 3b at these two points to calculate the left detection average value Lav. The right-left detection difference operation part 5c calculates the difference between the right detection average value Rav and the left detection average value Lav calculated by the average value operation part 5h to calculate the right-left detection difference |Rav−Lav|. Consequently, the pressure detection values Data(nR), Data(nL) at two points at which their detection time points are mutually different are averaged respectively to calculate the right detection average value Rav and the left detection average value Lav. Thus, the variation of the pressure detection values can be reduced, so that the accuracy in detecting the failure of the pressure sensors 3a, 3b can be improved.

If the right-left detection difference |Rav−Lav| calculated at the first time by the right-left detection difference operation part 5c is equal to or larger than the threshold value Dif, the disturbance avoiding part 5e makes the right-left detection difference operation part 5c calculate the right-left detection difference |Rav−Lav| repeatedly each time the time (Tde×2) that is shorter than the mutual calming time {(Tdm×2)+(Tde×2)} elapses until the mutual calming time {(Tdm×2)+(Tde×2)} elapses, and makes the sensor failure detection part 5d compare the calculated right-left detection difference |Rav−Lav| with the threshold value Dif for each calculation. If the right-left detection difference |Rav−Lav| calculated before the mutual calming time {(Tdm×2)+(Tde×2)} elapses is equal to or larger than the threshold value Dif, the disturbance avoiding part 5e withholds from the determination by the sensor failure detection part 5d that the pressure sensor 3a, 3b has failed. At the time when the right-left detection difference |Rav−Lav| calculated before the mutual calming time {(Tdm×2)+(Tde×2)} elapses is smaller than the threshold value Dif the disturbance avoiding part 5e makes the sensor failure detection part 5d determine that the pressure sensors 3a, 3b are normal. Consequently, if the pressure sensors 3a, 3b are normal, the failure detection can be ended quickly to mitigate the loads on the airbag controller 5A and the occupant protection device 1A for a vehicle. The disturbance avoiding part 5e sets the mutual calming time {(Tdm×2)+(Tde×2)} on the assumption that: after the effect of the closing operation of one of the driver's seat-side door 8a and the front passenger seat-side door 8b on the right door pressure sensor 3a or the left door pressure sensor 3b has reduced, the other one of the driver's seat-side door 8a and the front passenger seat-side door 8b is closed. As a result, it can be accurately determined whether the right door pressure sensor 3a or the left door pressure sensor 3b has failed or not even in the situation where the closing operations of the driver's seat-side door 8a and the front passenger seat-side door 8b are continuously performed to cause a long mutual calming time {(Tdm×2)+(Tde×2)}.

The present disclosure is not limited to the above embodiments, and can be modified or expanded as follows. In the present disclosure, a seat belt device with a pretensioner may be used for the occupant protection part to give tension to a seat belt, thus protecting the occupant when the detection value by one of the acceleration sensors 2a, 2b and the pressure sensors 3a, 3b is equal to or larger than a predetermined threshold value. The regions to which the pressure sensors 3a, 3b are attached are not only the driver's seat-side door 8a and the front passenger seat-side door 8b, but may be the rear seat doors of the vehicle 8. The pressure sensors 3a, 3b may be attached to slide doors of the vehicle 8. In addition to the acceleration sensors 2a, 2b and the pressure sensors 3a, 3b, a gyro sensor may be used to determine whether to actuate the airbag device 6 or not in the vehicle 8 In the second embodiment, the detection values Data(nR), Data(nL) by the pressure sensors 3a, 3b at three or more points at which their detection time points are mutually different may be averaged respectively to calculate the right detection average value Rav and the left detection average value Lav. In the second embodiment, each time the time Tde elapses, the right-left detection difference |PSR−PSL| may be calculated using the detection values PSR, PSL by the pressure sensors 3a, 3b (without calculating the right detection average value Rav or the left detection average value Lav), for the comparison between the right-left detection difference |PSR−PSL| and the threshold value Dif to detect the failure of the pressure sensors 3a, 3b.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A pressure sensor malfunction detection device comprising:
   a right door pressure sensor that is provided in a right door of a vehicle to detect a pressure change in the right door;
   a left door pressure sensor that is provided in a left door of the vehicle to detect a pressure change in the left door;
   a detection value comparison part that calculates a difference between a detection value by the right door pressure sensor and a detection value by the left door pressure sensor to calculate a right-left detection difference;
   a sensor failure detection part that determines that the right door pressure sensor or the left door pressure sensor has failed when the right-left detection difference calculated by the detection value comparison part is equal to or larger than a predetermined threshold value; and
   an external impact avoiding part that makes the sensor failure detection part withhold from determining that the right door pressure sensor or the left door pressure sensor has failed when the right-left detection difference calculated at a first time by the detection value comparison part is equal to or larger than the predetermined threshold value, wherein:
   the external impact avoiding part makes the detection value comparison part calculate the right-left detection difference again after a predetermined calming time has elapsed;
   an effect of a closing operation of the right door on the right door pressure sensor or an effect of a closing operation of the left door on the left door pressure sensor reduces during the calming time;
   the external impact avoiding part subsequently makes the sensor failure detection part compare the right-left detection difference calculated again with the threshold value;
   as a result of the comparison, when the right-left detection difference is equal to or larger than the threshold value, the external impact avoiding part makes the sensor failure detection part determine that the right door pressure sensor or the left door pressure sensor has failed; and
   the calming time starts when the right door pressure sensor detects the closing operation of the right door, or when the left door pressure sensor detects the closing operation of the left door.

2. The pressure sensor malfunction detection device according to claim 1, wherein the detection value comparison part calculates the right-left detection difference at the first time when an ignition switch of the vehicle is turned on.

3. The pressure sensor malfunction detection device according to claim 1, further comprising an average value calculation part that averages detection values by the right door pressure sensor at a plurality of points, at which their detection time points are mutually different, to calculate a right detection average value, and that averages detection values by the left door pressure sensor at the plurality of points to calculate a left detection average value, wherein the detection value comparison part calculates a difference between the right detection average value and the left detection average value, which are calculated by the average value calculation part, to calculate the right-left detection difference.

4. The pressure sensor malfunction detection device according to claim 1, wherein:
when the right-left detection difference calculated at the first time by the detection value comparison part is equal to or larger than the threshold value, the external impact avoiding part makes the detection value comparison part calculate the right-left detection difference repeatedly each time a predetermined period that is shorter than the calming time elapses, until the calming time elapses, and makes the sensor failure detection part compare the calculated right-left detection difference with the threshold value for each calculation;
when the right-left detection difference calculated before the calming time elapses is equal to or larger than the threshold value, the external impact avoiding part makes the sensor failure detection part withhold from determining that the right door pressure sensor or the left door pressure sensor has failed; and
at time when the right-left detection difference calculated before the calming time elapses is smaller than the threshold value, the external impact avoiding part makes the sensor failure detection part determine that the right door pressure sensor and the left door pressure sensor are normal.

5. The pressure sensor malfunction detection device according to claim 1, wherein the external impact avoiding part sets the calming time based on a case where: after the effect of the closing operation of one of the right door and the left door on the right door pressure sensor or the left door pressure sensor has reduced, the other one of the right door and the left door is closed.

6. The pressure sensor malfunction detection device according to claim 1, wherein
the external impact avoiding part makes the sensor failure detection part withhold from determining that the right door pressure sensor or the left door pressure sensor has failed until the predetermined calming time has elapsed when the right-left detection difference calculated at the first time by the detection value comparison part is equal to or larger than the threshold value.

7. The pressure sensor malfunction detection device according to claim 1, further comprising:
a collision detection part that detects a collision of the vehicle based on the detection values by the right door pressure sensor and the left door pressure sensor;
an occupant protection part that protects an occupant's body against an impact applied to the vehicle;
a protection drive part that actuates the occupant protection part when the collision detection part detects the collision of the vehicle; and
an operation check part that determines whether the occupant protection part is driven normally, wherein after the operation check part determines that the occupant protection part is driven normally, the detection value comparison part calculates the right-left detection difference at the first time.

8. The pressure sensor malfunction detection device according to claim 7, wherein when the sensor failure detection part determines that the right door pressure sensor or the left door pressure sensor has failed, the protection drive part prohibits an operation of the occupant protection part.

9. A pressure sensor malfunction detection device comprising:
a right door pressure sensor that is provided in a right door of a vehicle to detect a pressure change in the right door;
a left door pressure sensor that is provided in a left door of the vehicle to detect a pressure change in the left door;
a detection value comparison part that calculates a difference between a detection value by the right door pressure sensor and a detection value by the left door pressure sensor to calculate a right-left detection difference;
a sensor failure detection part that determines that the right door pressure sensor or the left door pressure sensor has failed when the right-left detection difference calculated by the detection value comparison part is equal to or larger than a predetermined threshold value; and
an external impact avoiding part that makes the sensor failure detection part withhold from determining that the right door pressure sensor or the left door pressure sensor has failed when the right-left detection difference calculated at a first time by the detection value comparison part is equal to or larger than the predetermined threshold value, wherein:
the external impact avoiding part makes the detection value comparison part calculate the right-left detection difference again after a predetermined calming time has elapsed;
an effect of a closing operation of the right door on the right door pressure sensor or an effect of a closing operation of the left door on the left door pressure sensor reduces during the calming time;
the external impact avoiding part subsequently makes the sensor failure detection part compare the right-left detection difference calculated again with the threshold value;
as a result of the comparison, when the right-left detection difference is equal to or larger than the threshold value, the external impact avoiding part makes the sensor failure detection part determine that the right door pressure sensor or the left door pressure sensor has failed; and
the calming time starts when the right door pressure sensor detects the closing operation of the right door, or when the left door pressure sensor detects the closing operation of the left door, wherein
the detection value comparison part calculates the right-left detection difference at the first time when an ignition switch of the vehicle is turned on.

* * * * *